United States Patent
Osawa et al.

(10) Patent No.: US 8,890,078 B2
(45) Date of Patent: Nov. 18, 2014

(54) RADIATION DETECTOR

(75) Inventors: Hirotake Osawa, Hamamatsu (JP);
Yutaka Kusuyama, Hamamatsu (JP);
Shintaro Toyama, Hamamatsu (JP);
Masanori Yamashita, Hamamatsu (JP);
Munenori Shikida, Hamamatsu (JP)

(73) Assignee: Hamamatsu Photonics K.K.,
Hamamatsu-shi, Shizuoka (JP)

( * ) Notice: Subject to any disclaimer, the term of this patent is extended or adjusted under 35 U.S.C. 154(b) by 0 days.

(21) Appl. No.: 13/810,254

(22) PCT Filed: Jun. 17, 2011

(86) PCT No.: PCT/JP2011/063972
§ 371 (c)(1),
(2), (4) Date: Jan. 15, 2013

(87) PCT Pub. No.: WO2012/026188
PCT Pub. Date: Mar. 1, 2012

(65) Prior Publication Data
US 2013/0112882 A1    May 9, 2013

(30) Foreign Application Priority Data

Aug. 24, 2010  (JP) .................................. 2010-187444

(51) Int. Cl.
*G01T 1/10* (2006.01)
*G01T 1/202* (2006.01)

(52) U.S. Cl.
CPC ...................................... *G01T 1/202* (2013.01)
USPC ...................................................... 250/361 R

(58) Field of Classification Search
CPC .............................. G21K 2004/12; G01T 1/20
USPC ...................................................... 250/361 R
See application file for complete search history.

(56) References Cited

U.S. PATENT DOCUMENTS

2008/0083877 A1    4/2008   Nomura et al.
2010/0006762 A1*   1/2010   Yoshida et al. ............ 250/361 R

FOREIGN PATENT DOCUMENTS

| CN | 101419289 A | 4/2009 |
|---|---|---|
| CN | 101657737 A | 2/2010 |
| JP | 2000-284053 A | 10/2000 |
| JP | 2004-61115 | 2/2004 |
| JP | 2007-57428 | 3/2007 |
| JP | 2007240306 A | 9/2007 |
| JP | 2009-031098 | 2/2009 |
| JP | 2009-068888 | 4/2009 |
| JP | 2009-103676 | 5/2009 |
| WO | 2008/018277 | 2/2008 |
| WO | WO 2008/117821 | 10/2008 |

* cited by examiner

*Primary Examiner* — Kiho Kim
(74) *Attorney, Agent, or Firm* — Drinker Biddle & Reath LLP (57) ABSTRACT

Provided is a radiation detector 1 capable of improving reliability associated with radiation detection. The radiation detector 1 includes: a supporting substrate 2 that can transmit radiation there-through; a scintillator layer 3 formed on one principal surface 2a of the supporting substrate 2, the scintillator layer 3 including an incident surface 3a on which radiation is incident and an emission surface 3b emitting light generated by the incident radiation and on a side opposite to the incident surface 3a; and a light detection portion 5 disposed on an emission surface side of the scintillator layer 3 for detecting light emitted from the emission surface 3b.

20 Claims, 8 Drawing Sheets

RADIATION DETECTOR

TECHNICAL FIELD

The present invention relates to a radiation detector that detects a radiation.

BACKGROUND ART

In the related art, techniques disclosed in Patent Literatures 1 and 2, for example, are known as a technique regarding a radiation detector. Patent Literature 1 discloses a radiation detection device that includes a flat plate-shaped supporting substrate that is made from a resin, a layered scintillator that is formed on one principal surface of the supporting substrate, a moisture-proof protective layer that covers the outer sides of the supporting substrate and the scintillator, and a sensor panel that is disposed in a portion of the scintillator closer to a side opposite to the supporting substrate so as to detect light generated by the scintillator.

In the radiation detection device disclosed in Patent Literature 1, the supporting substrate and the scintillator are attached to the sensor panel by an adhesive layer. The adhesive layer is formed between the supporting substrate and the sensor panel so as to cover the outer periphery of the scintillator. Moreover, a sealing portion for preventing an outflow of an adhesive agent is formed in the outer periphery of the adhesive layer.

Patent Literature 2 discloses a radiation flat panel detector that includes a flat plate-shaped substrate that is made from a polymer film, a phosphor layer that is formed on the substrate, a moisture-proof protective film that covers outer sides of the substrate and the phosphor layer, and a light receiving element that is disposed in a portion of the phosphor layer closer to a side opposite to the substrate so as to detect light generated in the phosphor layer.

CITATION LIST

Patent Literature

Patent Literature 1: JP 2004-61115 A
Patent Literature 2: WO 2008/018277 A

SUMMARY OF INVENTION

Technical Problem

However, in the above-described radiation detection device of the related art, when the device is assembled, shrinkage stress resulting from curing of an adhesive agent is strongly applied to the outer periphery of the scintillator. When a deformation occurs in the scintillator due to the effect of the stress, an adverse effect such as deterioration of resolution occurs in the scintillator. Therefore, there is a problem in that reliability associated with radiation detection by the device decreases.

The present invention has been made in view of the above problem, and an object of the present invention is to provide a radiation detector capable of improving reliability associated with radiation detection.

Solution to Problem

A radiation detector comprising: a radiation transmission substrate that can transmit radiation there-through; a scintillator layer formed on one principal surface of the radiation transmission substrate, the scintillator layer including an incident surface on which radiation is incident and an emission surface emitting light generated by the incident radiation and on a side opposite to the incident surface; and a light detection portion disposed on an emission surface side of the scintillator layer for detecting light emitted from the emission surface, wherein a side surface of the scintillator layer is inclined outwardly as the side surface advances from the incident surface to the emission surface, and the radiation transmission substrate has an outer edge portion that reaches the side surface of the scintillator layer.

According to the radiation detector, the outer edge portion of the radiation transmission substrate extends to reach the side surface of the scintillator layer, and the outer periphery of the scintillator layer is reinforced by the substrate. Thus, when the scintillator layer and the light detection portion are attached, it is possible to suppress a deformation of the scintillator layer due to the effect of shrinkage stress resulting from curing of an adhesive agent. Moreover, in the radiation detector, the side surface of the scintillator layer is inclined toward the outer side as the side surface advances from the incident surface to the emission surface. Thus, it is possible to increase deformation resisting power against shrinkage stress of the adhesive agent as compared to a case where the side surface of the scintillator layer is vertical to the emission surface or is inclined in the opposite direction. Therefore, according to the radiation detector, it is possible to prevent deterioration of the performance of the scintillator layer resulting from a deformation of the scintillator layer. Accordingly, it is possible to improve reliability associated with radiation detection of the radiation detector.

In the radiation detector, the radiation transmission substrate may be made from a polymer film.

According to the radiation detector, a flexible substrate made from a polymer film is used as the radiation transmission substrate. Thus, it is possible to deform the radiation transmission substrate and the scintillator so as to conform to the shape of the light detection portion. As a result, in the radiation detector, since the gap between the scintillator and the light detection portion can be suppressed to be as small as possible, it is possible to suppress deterioration of the resolution resulting from the presence of the gap between the scintillator and the light detection portion.

In the radiation detector, the radiation transmission substrate has an opposing end portion formed on an outer side of the outer edge portion such that the outer edge portion faces the light detection portion.

According to the radiation detector, the opposing end portion of the radiation transmission substrate is attached to the light detection portion. In this way, it is possible to reliably fix the radiation transmission substrate and the light detection portion with a small amount of the adhesive agent as compared to a case where the opposing end portion is not provided.

The radiation detector may further include an adhesive layer that attaches the scintillator layer and the radiation transmission substrate to the light detection portion.

According to the radiation detector, the emission surface of the scintillator layer and the opposing end portion of the radiation transmission substrate are attached to the light detection portion by the adhesive layer. In this way, it is possible to reliably fix the scintillator layer and the radiation transmission substrate to the light detection portion with a simple configuration.

The radiation detector may further include a moisture-proof protective film covering outer sides of the radiation transmission substrate and the scintillator layer, and the radiation transmission substrate and the scintillator layer may be attached to the adhesive layer via the moisture-proof protective film.

According to the radiation detector, since the moisture-proof protective film suppresses moisture from entering into the scintillator layer, it is possible to prevent deterioration of the performance of the scintillator layer due to the entering moisture.

In the radiation detector, an angle between the emission surface and the side surface of the scintillator layer may be between 5° and 80°.

Further, in the radiation detector, the angle between the emission surface and the side surface of the scintillator layer may be between 5° and 45°.

Advantageous Effects of Invention

According to the present invention, it is possible to improve reliability associated with radiation detection.

DESCRIPTION OF EMBODIMENTS

Hereinafter, a preferred embodiment of the present invention will be described in detail with reference to the drawings. In addition, in the description of the drawings, the same or corresponding portions will be denoted by the same reference numerals, and redundant description thereof will not be provided.

Figure 1:
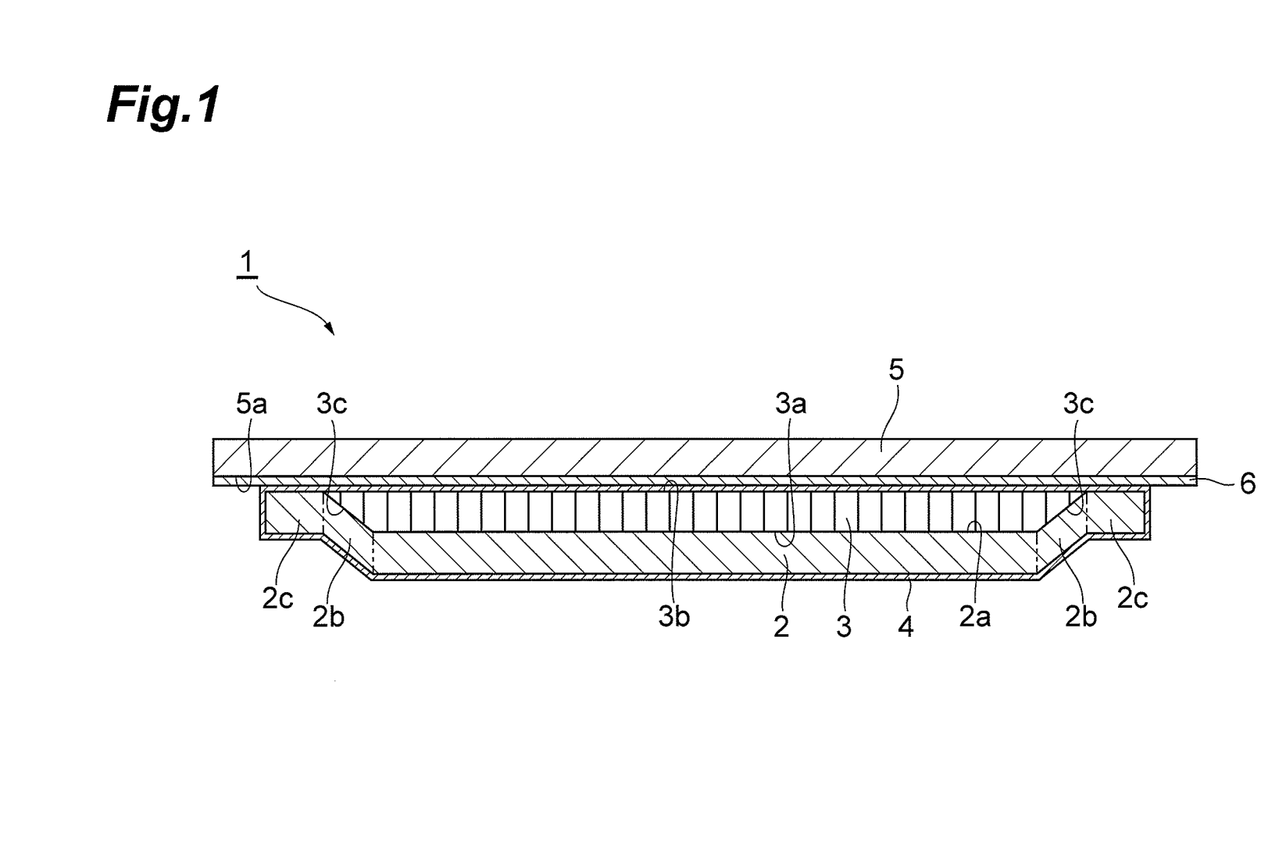
FIG. 1 is a cross-sectional view illustrating an embodiment of a radiation detector according to the present invention.

As illustrated in FIG. 1, a radiation detector 1 according to the present embodiment is configured to detect a radiation such as an X-ray by converting the radiation into light and is used, for example, in a positron emission tomography (PET) apparatus or a computed tomography (CT) apparatus. The radiation detector 1 includes a supporting substrate 2, a scintillator layer 3, a moisture-proof protective film 4, a light detection portion 5, and an adhesive layer 6.

The supporting substrate 2 is a radiation transmission substrate that transmits a radiation such as an X-ray. The supporting substrate 2 is a flexible substrate made from a polymer film having a thickness of approximately 100 μm. An example of a polymer that forms the supporting substrate 2 includes polyimide. The scintillator layer 3 is deposited and formed on one principal surface 2a of the supporting substrate 2.

The supporting substrate 2 is formed in a thin dish shape such that the principal surface 2a is on the inner side. The supporting substrate 2 includes an outer edge portion 2b that is inclined toward the principal surface 2a and an opposing end portion 2c that is formed on an outer side of the outer edge portion 2b. The outer edge portion 2b is formed along the outer periphery of the supporting substrate 2. The outer edge portion 2b extends to reach a side surface 3c of the scintillator layer 3. The outer edge portion 2b is inclined along the side surface 3c of the scintillator layer 3. Moreover, the opposing end portion 2c is formed in a flange form on the outer side of the outer edge portion 2b. The opposing end portion 2c is formed so as to face the light detection portion 5 in a thickness direction of the supporting substrate 2.

The scintillator layer 3 is made from columnar crystals of cesium iodide (CsI) doped with thallium (Tl), for example. The scintillator layer 3 is formed by growing columnar crystals on the principal surface 2a of the supporting substrate 2 by a vapor deposition method. The thickness of the scintillator layer 3 is 600 μm, for example. The scintillator layer 3 has an approximately quadrangular pyramid shape. The scintillator layer 3 having an approximately quadrangular pyramid shape has an incident surface 3a and an emission surface 3b that are approximately parallel to each other, and side surfaces 3c.

The incident surface 3a is a surface on which a radiation having passed through the supporting substrate 2 is incident. The incident surface 3a is formed along the principal surface 2a of the supporting substrate 2. The emission surface 3b is a surface from which light generated within the scintillator layer 3 due to the incident radiation is emitted. The emission surface 3b is formed on a side opposite to the incident surface 3a. The emission surface 3b has a larger area than the incident surface 3a.

Figure 2:
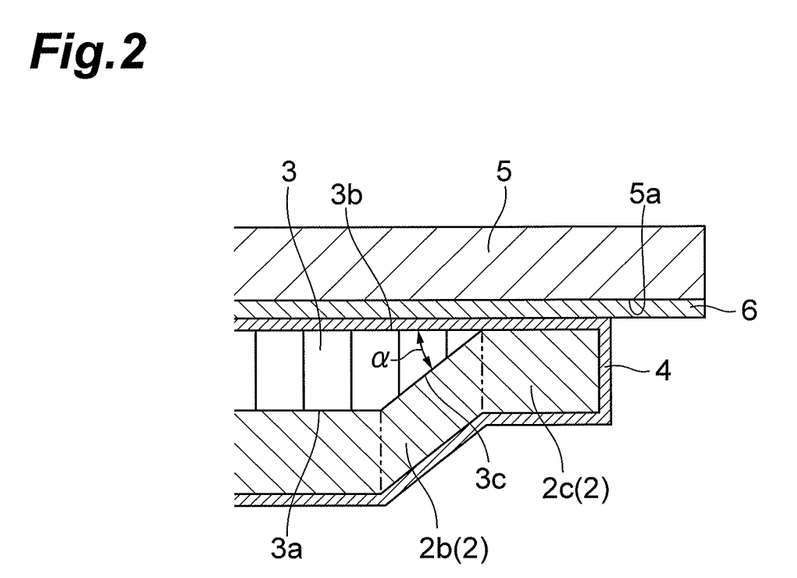
FIG. 2 is an enlarged cross-sectional view illustrating an inclination angle of a scintillator layer.

The side surface 3c is a surface that is inclined in relation to the incident surface 3a and the emission surface 3b. The side surface 3c is inclined toward the outer side as it advances from the incident surface 3a to the emission surface 3b. Although an effective area increases as an inclination angle α between the side surface 3c and the emission surface 3b approaches 90°, the smaller the inclination angle, the easier it is to bond a flexible substrate. Thus, the inclination angle α may be between 5° and 80° and may be between 5° and 45° from the perspective of improving workability and decreasing deformation of the side surface 3c. Moreover, the side surface 3c is covered with the outer edge portion 2b. A radiation having passed through the supporting substrate 2 is incident on the side surface 3c.

The moisture-proof protective film 4 is a protective film for preventing moisture from entering into the scintillator layer 3. The moisture-proof protective film 4 is made from polyparaxylylene, for example. The moisture-proof protective film 4 covers the outer sides of the supporting substrate 2 and the scintillator layer 3. The supporting substrate 2 and the scintillator layer 3 are sealed by the moisture-proof protective film 4. The supporting substrate 2 and the scintillator layer 3 have flexible properties in a state of being sealed by the moisture-proof protective film 4.

The light detection portion 5 is an image sensor that detects light emitted from the emission surface 3b of the scintillator layer 3. A charge coupled device (CCD) image sensor, a photodiode array, or the like is used as the light detection portion 5. The light detection portion 5 has an approximately flat plate shape. The light detection portion 5 is disposed in a portion of the scintillator layer 3 closer to the emission surface 3b. Specifically, the light detection portion 5 has a light receiving surface 5a that detects light and is disposed to face the emission surface 3b of the scintillator layer 3. The light detection portion 5 is attached to the supporting substrate 2 and the scintillator layer 3 by an adhesive layer 6.

The adhesive layer 6 is made from a resin having low moisture permeability such as an epoxy-based resin, a urethane-based resin, or a silicone-based resin. The adhesive layer 6 is formed between the supporting substrate 2 and scintillator layer 3 and the light detection portion 5. The adhesive layer 6 is attached to the emission surface 3b of the scintillator layer 3 through the moisture-proof protective film 4 interposed. Moreover, the adhesive layer 6 is attached to the opposing end portion 2c of the supporting substrate 2 through the moisture-proof protective film 4 interposed. The adhesive layer 6 is attached to the supporting substrate 2 and the scintillator layer 3 through the moisture-proof protective film 4 interposed and is also attached to the light receiving surface 5a of the light detection portion 5. In this way, the adhesive layer 6 attaches and fixes the supporting substrate 2 and the scintillator layer 3 to the light detection portion 5.

Next, a method for manufacturing the radiation detector 1 according to the present embodiment will be described with reference to the drawings.

Figure 3:
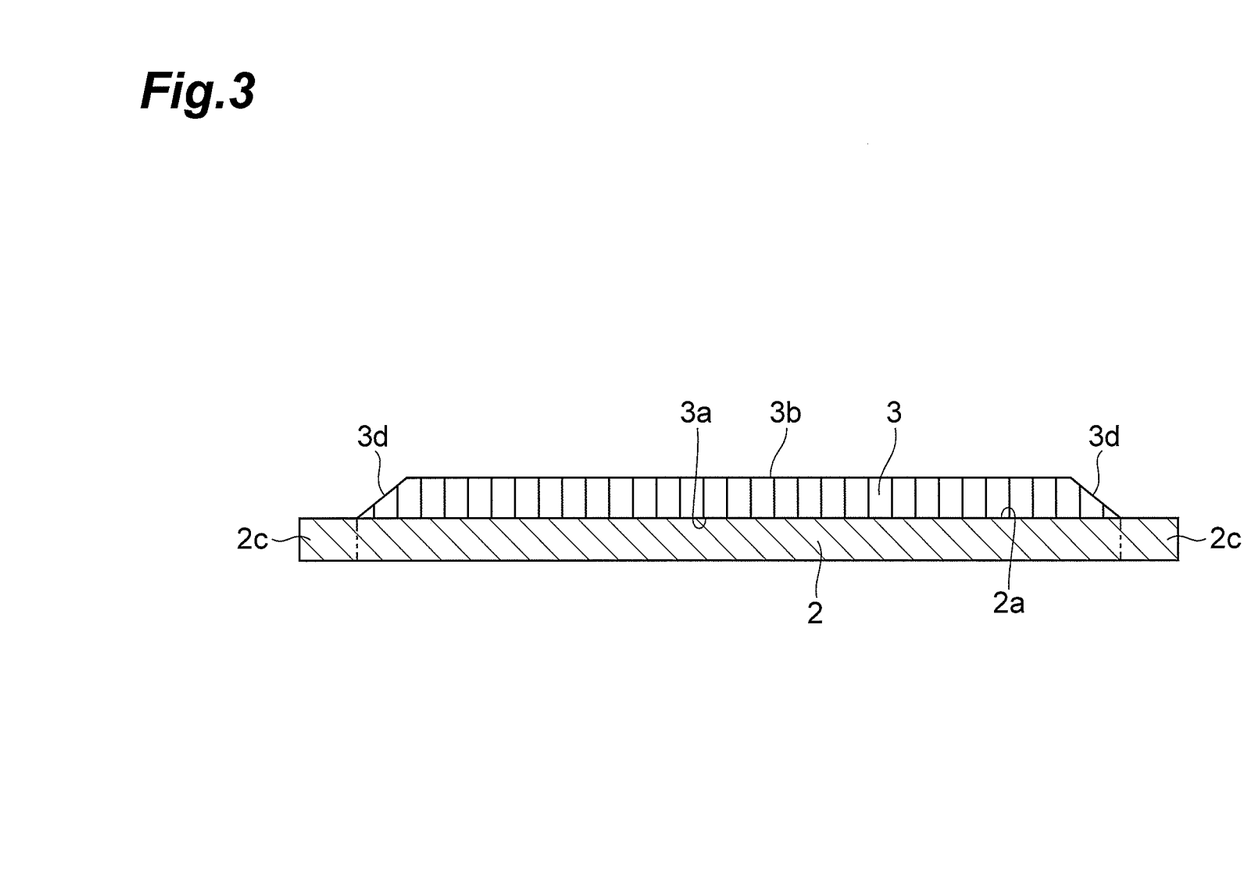
FIG. 3 is a cross-sectional view illustrating a scintillator layer forming step.
Figure 4:
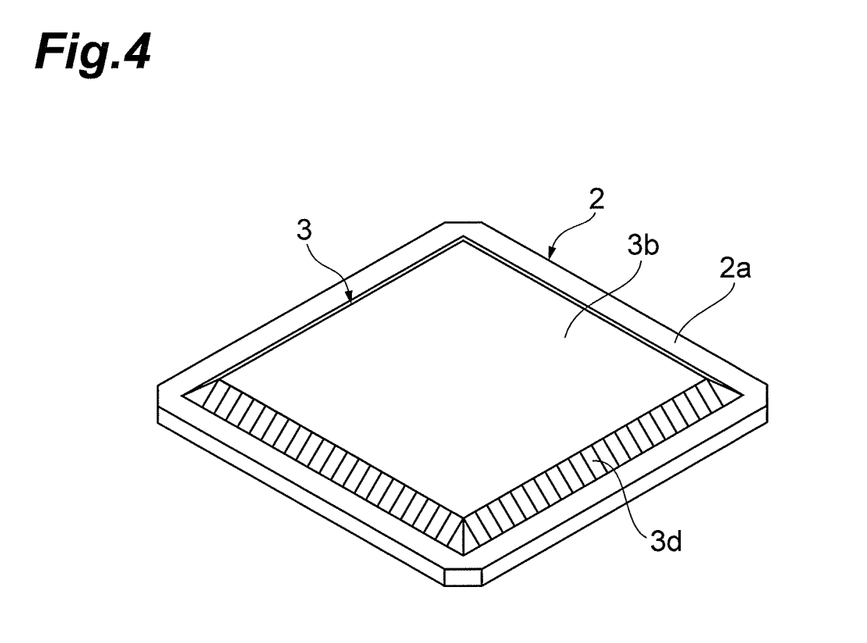
FIG. 4 is a perspective view illustrating the scintillator layer forming step.
Figure 5:
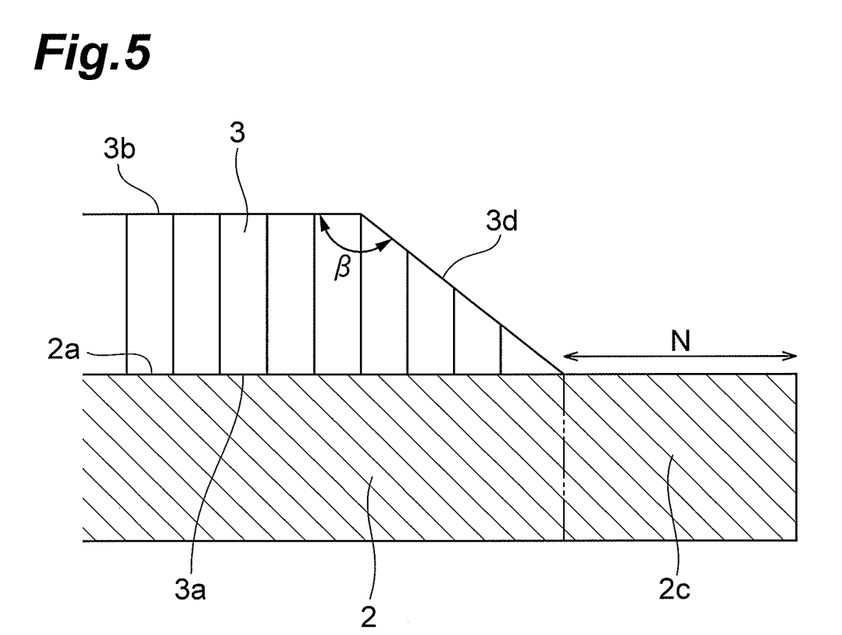
FIG. 5 is an enlarged cross-sectional view illustrating an inclination angle during forming in the scintillator layer forming step.
Figure 6:
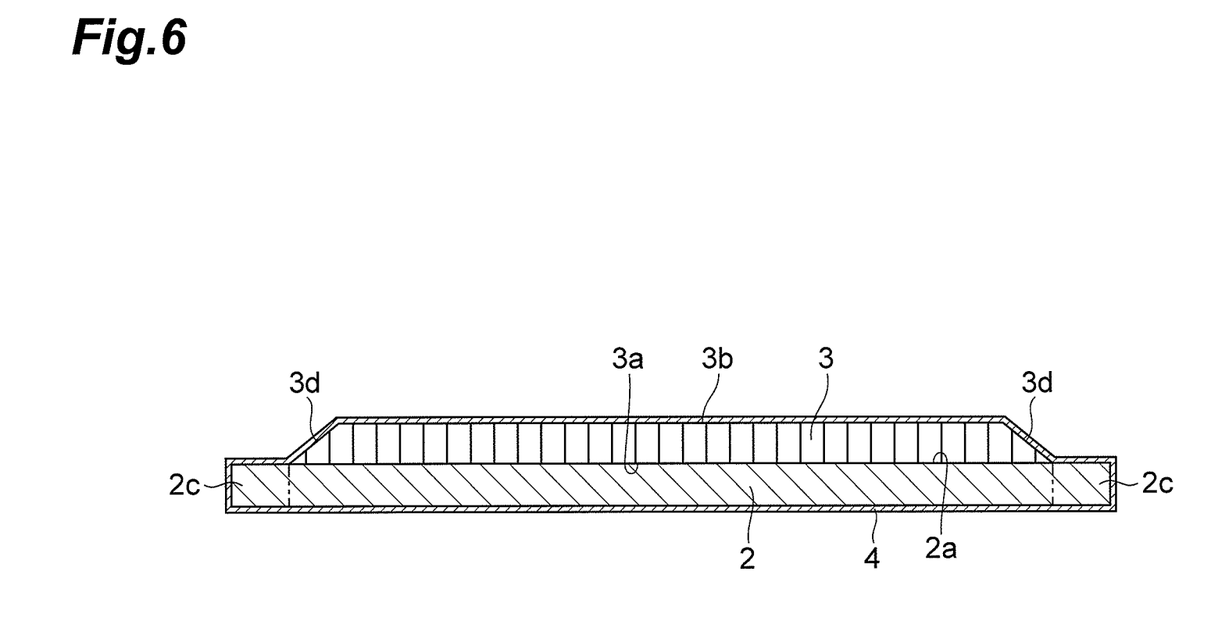
FIG. 6 is a cross-sectional view illustrating a protective film forming step.
Figure 7:
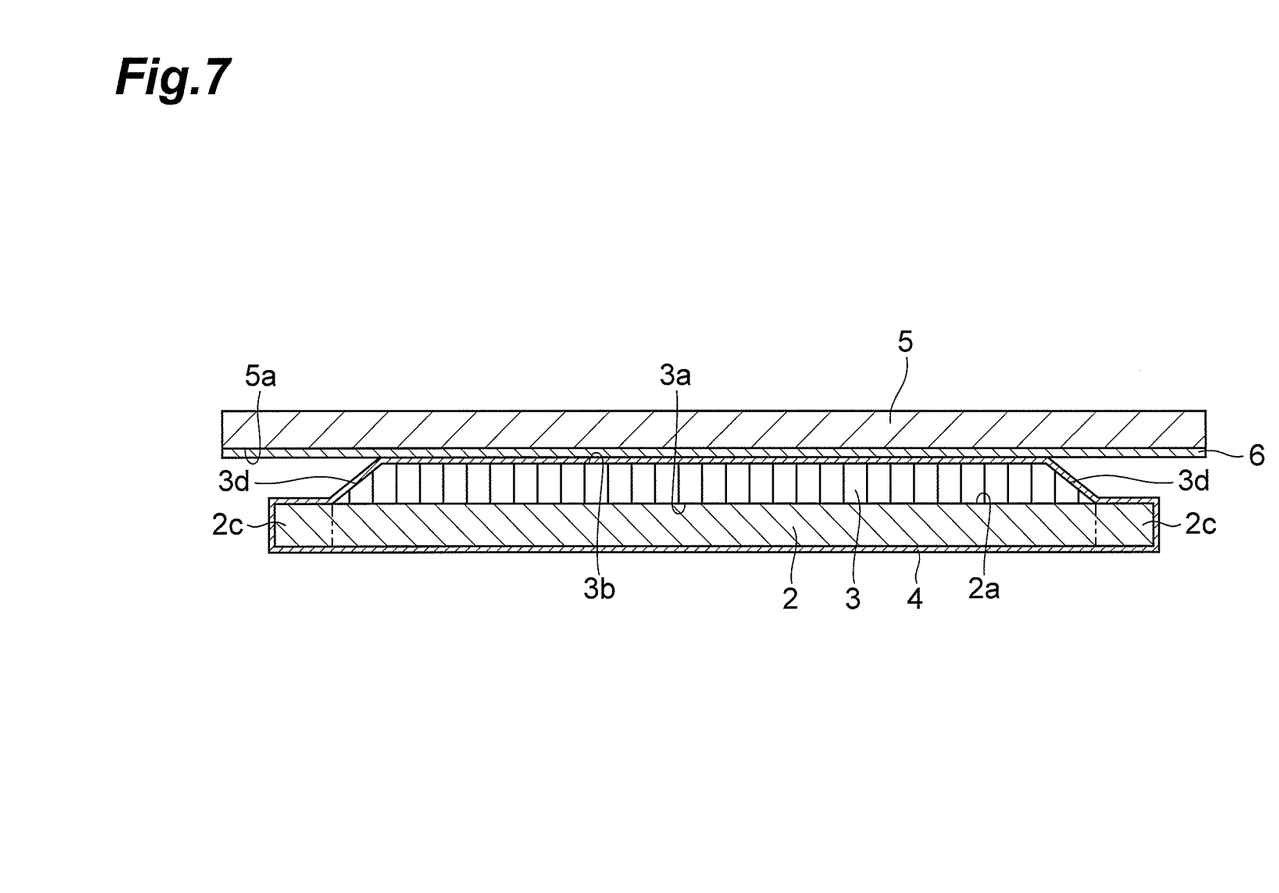
FIG. 7 is a cross-sectional view illustrating an attachment step.
Figure 8:
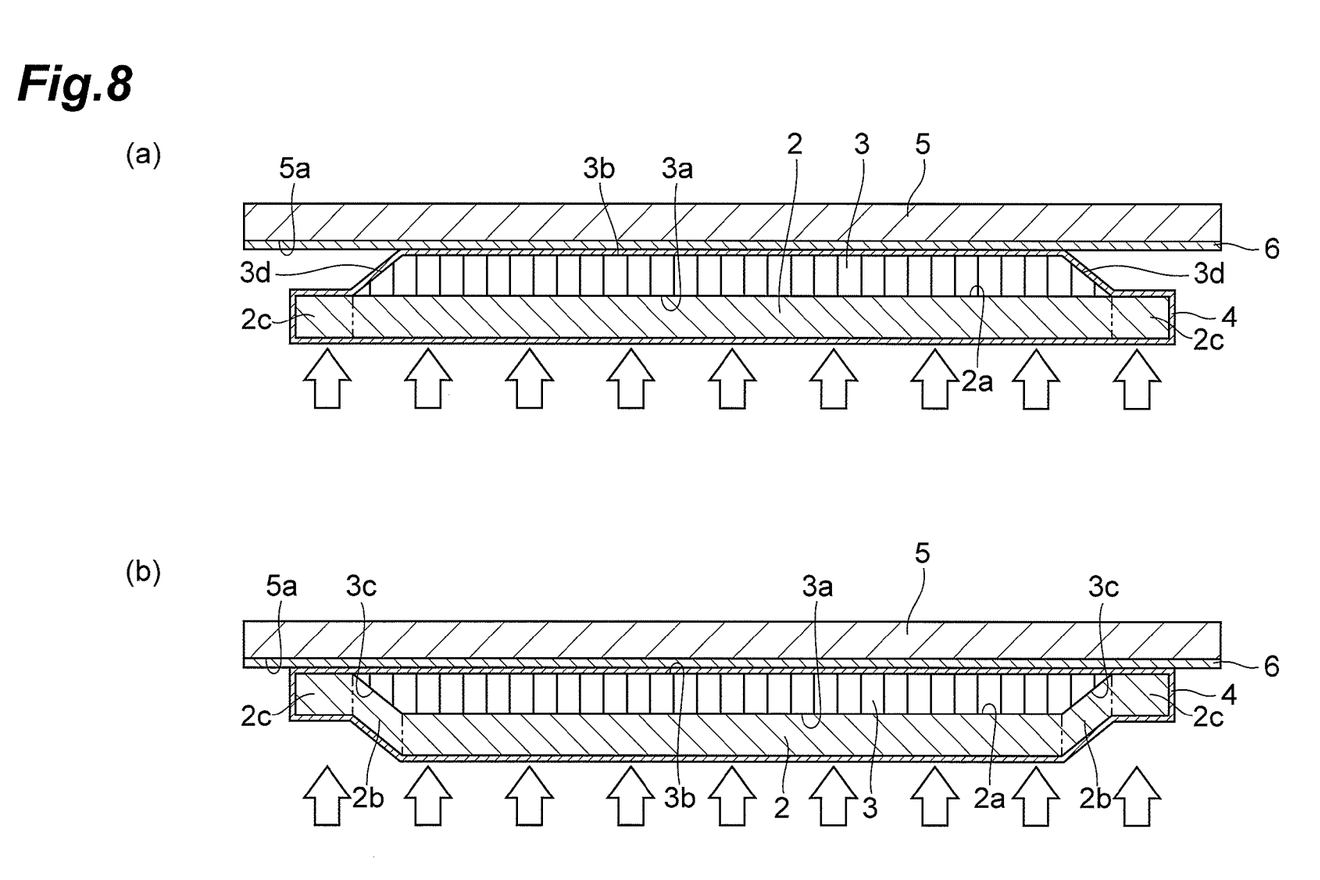
FIG. 8 is a cross-sectional view illustrating a deformation step.

FIGS. 3 to 5 are diagrams illustrating a scintillator forming step of forming the scintillator layer 3 on the supporting substrate 2. FIG. 6 is a diagram illustrating a protective film forming step of forming the moisture-proof protective film 4. FIG. 7 is a diagram illustrating an attachment step of attaching the supporting substrate 2 and the scintillator layer 3 to the light detection portion 5. FIGS. 8(a) and 8(b) are diagrams illustrating a deformation step of deforming the supporting substrate 2 and the scintillator layer 3. Specifically, FIG. 8(a) illustrates the supporting substrate 2 and the scintillator layer 3 when the deformation step starts. FIG. 8(b) illustrates the supporting substrate 2 and the scintillator layer 3 when the deformation step ends.

First, in the scintillator layer forming step illustrated in FIGS. 3 to 5, the scintillator layer 3 is formed on the principal surface 2a of the supporting substrate 2. In the scintillator layer forming step, the supporting substrate 2 is fixed to a reinforcing plate having a sufficient rigidity. After that, Tl-doped CsI is vapor-deposited on the principal surface 2a in a state where the supporting substrate 2 and the reinforcing plate are rotated, whereby the scintillator layer 3 is formed.

The scintillator layer 3 is formed in a region of the principal surface 2a of the supporting substrate 2 closer to the center. That is, a non-coated area on which the scintillator layer 3 is not formed is formed on the outer side of the principal surface 2a. A width N of the non-coated area illustrated in FIG. 5 is preferably small from the perspective of decreasing a constituent member and is preferably large from the perspective of improving assembling workability. The width N of the non-coated area may be in the range of 1 mm to 10 mm, for example. The non-coated area corresponds to a region that corresponds to the above-described opposing end portion 2c of the principal surface 2a.

The scintillator layer 3 formed in the scintillator layer forming step has an approximately quadrangular pyramid shape such that the scintillator layer broadens as it advances from the emission surface 3b to the incident surface 3a. The scintillator layer 3 in this stage has such a structure that the area of the incident surface 3a is larger than the area of the emission surface 3b, and an inclined state of the side surface 3d is different from that of the side surface 3c of FIG. 1. The side surface 3d protrudes outward as it advances from the emission surface 3b to the incident surface 3a. An inclination angle β between the side surface 3d and the emission surface 3b may be greater than 90° and smaller than 180°. The inclination angle β may be in the range of 100° to 175° and may be in the range of 135° to 175°.

Subsequently, in the protective film forming step illustrated in FIG. 6, the moisture-proof protective film 4 is formed. In the protective film forming step, the supporting substrate 2 on which the scintillator layer 3 is formed is input into a vapor deposition chamber of a chemical vapor deposition (CVD) apparatus. Moreover, by a CVD method of exposing the supporting substrate 2 to vapor that is obtained by sublimating the raw material of polyparaxylylene, the moisture-proof protective film 4 is formed so as to cover the outer sides of the supporting substrate 2 and the scintillator layer 3. The supporting substrate 2 and the scintillator layer 3 have sufficient flexible properties in a state of being covered by the moisture-proof protective film 4.

Subsequently, in the attachment step illustrated in FIG. 7, the supporting substrate 2 and the scintillator layer 3 that are covered by the moisture-proof protective film 4 are attached to the light detection portion 5. In the attachment step, first, the adhesive layer 6 is formed on the light receiving surface 5a of the light detection portion 5. After the adhesive layer 6 is formed, the supporting substrate 2 and the scintillator layer 3 are attached to the light detection portion 5 so that the emission surface 3b of the scintillator layer 3 faces the light receiving surface 5a of the light detection portion 5.

After that, in the deformation step illustrated in FIGS. 8(a) and 8(b), the supporting substrate 2 and the scintillator layer 3 are deformed so as to extend along the light receiving surface 5a of the light detection portion 5. In this deformation step, the supporting substrate 2 and the scintillator layer 3 having flexible properties are deformed by pressing the same toward the light detection portion 5. Due to the pressing, the supporting substrate 2 and the scintillator layer 3 are deformed from the state illustrated in FIG. 8(a) to the state illustrated in FIG. 8(b). The supporting substrate 2 and the scintillator layer 3 are deformed so as to be closely attached along the light receiving surface 5a of the light detection portion 5.

Specifically, in the scintillator layer 3, the side surface 3d is pressed against the light receiving surface 5a of the light detection portion 5 and is deformed to be the same surface as the emission surface 3b. At the same time, a portion of the incident surface 3a of the scintillator layer 3 is deformed to form the side surfaces 3c.

On the other hand, with the deformation of the scintillator layer 3, the supporting substrate 2 is deformed from the flat plate shape illustrated in FIG. 8(a) into an approximately shallow dish shape illustrated in FIG. 8(b). Due to this deformation, the outer edge portion 2b and the opposing end portion 2c are formed on the outer periphery side of the supporting substrate 2. The outer edge portion 2b is formed by being bent so as to extend along the side surface 3c in accordance with the forming of the side surface 3c of the scintillator layer 3. The outer edge portion 2b is inclined along the side surface 3c of the scintillator layer 3. The opposing end portion 2c is moved toward the light detection portion 5 in accordance with the forming of the outer edge portion 2b. Due to this movement, the principal surface 2a (the above-described non-coated area) of the opposing end portion 2c and the adhesive layer 6 are attached through the moisture-proof protective film 4 interposed. The area of the non-coated area corresponds to the area of the opposing end portion 2c attached to the adhesive layer 6.

After the respective steps described above are executed, the adhesive layer 6 is cured, and a predetermined finishing treatment is performed. In this way, the radiation detector 1 illustrated in FIG. 1 is obtained.

Subsequently, operations and effects of the radiation detector 1 according to the present embodiment will be described.

According to the radiation detector 1 of the present embodiment, the outer edge portion 2b of the supporting substrate 2 extends to reach the side surface 3c of the scintillator layer 3, and the outer periphery of the scintillator layer 3 is reinforced by the supporting substrate 2. Thus, when the scintillator layer 3 and the light detection portion 5 are attached, it is possible to suppress a deformation of the scintillator layer 3 due to the effect of shrinkage stress resulting from curing of an adhesive agent. Moreover, the side surface 3c of the scintillator layer 3 is inclined toward the outer side as the side surface 3c advances from the incident surface 3a to the emission surface 3b. Thus, it is possible to increase deformation resisting power against shrinkage stress of an adhesive agent as compared to a case where the side surface 3c of the scintillator layer 3 is vertical to the emission surface 3b or is inclined in the opposite direction. Therefore, according to the radiation detector 1, it is possible to prevent deterioration of the performance of the scintillator layer 3 resulting from a deformation of the scintillator layer 3. Accordingly, it is possible to improve reliability associated with radiation detection of the radiation detector 1.

Moreover, according to the radiation detector 1, a flexible substrate made from a polymer film is used as the supporting substrate 2. Thus, it is possible to deform the supporting substrate 2 and the scintillator layer 3 so as to conform to the shape of the light detection portion 5. As a result, since the gap between the scintillator layer 3 and the light detection portion 5 can be decreased, it is possible to suppress deterioration of the resolution resulting from the gap between the scintillator layer 3 and the light detection portion 5. Moreover, since a flexible substrate is used as the supporting substrate 2, it is possible to form the outer edge portion 2b easily.

Further, according to the radiation detector 1, the outer edge portion 2b of the supporting substrate 2 extends to reach the side surface 3c of the scintillator layer 3. Thus, the distance between the supporting substrate 2 and the light detection portion 5 is small as compared to a case where the supporting substrate 2 has a flat plate shape such that the supporting substrate 2 does not extend to reach the side surface 3c of the scintillator layer 3. Therefore, it is possible to attach the supporting substrate 2 and the light detection portion 5 with a small amount of the adhesive agent. Moreover, according to the radiation detector 1, the opposing end portion 2c is provided on the outer side of the outer edge portion 2b so as to face the light detection portion 5. Thus, it is possible to reliably fix the supporting substrate 2 and the light detection portion 5 with a small amount of the adhesive agent as compared to a case where the opposing end portion 2c is not provided. Therefore, in the radiation detector 1, it is possible to realize attachment between the supporting substrate 2 and scintillator layer 3 and the light detection portion 5 just by applying a smaller amount of the adhesive agent to the light receiving surface 5a of the light detection portion 5 as compared to the related art. Accordingly, it is not necessary to provide a sealing member that surrounds the periphery of the adhesive layer in order to prevent an outflow of the adhesive agent that is not cured. As a result, it is possible to improve assembling workability and reduce the number of constituent members.

Moreover, according to the radiation detector 1, the emission surface 3b of the scintillator layer 3 and the opposing end portion 2c of the supporting substrate 2 are attached to the light detection portion 5 by the adhesive layer 6. In this way, it is possible to fix the scintillator layer 3 and the supporting substrate 2 to the light detection portion 5 with a simple configuration.

Moreover, according to the radiation detector 1, since the moisture-proof protective film 4 is provided so as to cover the outer sides of the supporting substrate 2 and the scintillator layer 3, it is possible to suppress moisture from entering into the scintillator layer 3. Further, in the radiation detector 1, since the side surface 3c of the scintillator layer 3 is covered by the outer edge portion 2b of the supporting substrate 2, entering of moisture into the scintillator layer 3 is suppressed as compared to a case where the side surface 3c of the scintillator layer 3 is not covered by the supporting substrate 2. Therefore, according to the radiation detector 1, it is possible to prevent deterioration of the scintillator layer 3 due to entering moisture. This contributes to extending the lifespan of the radiation detector 1.

The present invention is not limited to the above-described embodiment.

For example, the material of the supporting substrate 2 is not limited to a polymer film, and aluminum may be used. Moreover, the supporting substrate 2 does not always have to have flexible properties.

Moreover, the side surface 3c of the scintillator layer 3 does not always have to be entirely covered by the supporting substrate 2, and only a portion may be covered. Further, the opposing end portion 2c of the supporting substrate 2 does not have to be attached to the adhesive layer 6. That is, the scintillator layer 3 is not limited to being sealed by the supporting substrate 2 and the adhesive layer 6, and a gap may be formed in a lateral side of the scintillator layer 3. Moreover, the flange-shaped opposing end portion 2c does not always have to be formed. Further, the moisture-proof protective film 4 does not always have to be formed.

Industrial Applicability

The present invention can be used in a radiation detector.

Reference Signs List

1 . . . radiation detector; 2 . . . supporting substrate (radiation transmission substrate); 2a . . . principal surface; 2b . . . outer edge portion; 2c . . . opposing end portion; 3 . . . scintillator layer; 3a . . . incident surface; 3b . . . emission surface; 3c . . . side surface; 4 . . . moisture-proof protective film; 5 . . . light detection portion; 6 . . . adhesive layer; α . . . slope angle

The invention claimed is:

1. A radiation detector comprising:
a radiation transmission substrate that can transmit radiation there-through;
a scintillator layer formed on one principal surface of the radiation transmission substrate, the scintillator layer including an incident surface on which radiation is incident and an emission surface emitting light generated by the incident radiation and on a side opposite to the incident surface; and
a light detection portion disposed on an emission surface side of the scintillator layer for detecting light emitted from the emission surface,
wherein a side surface of the scintillator layer is inclined to form a beveled edge so that the incident surface is smaller than the emission surface, and
the radiation transmission substrate has an outer edge portion that is in contact with the inclined side surface of the scintillator layer.

2. The radiation detector according to claim 1, wherein the radiation. transmission substrate is made from a polymer film.

3. The radiation detector according to claim 2, wherein the radiation transmission substrate has an opposing end portion formed on an outer side of the outer edge portion such that the outer edge portion faces the light detection portion.

4. The radiation detector according to claim 2, further comprising an adhesive layer that attaches the scintillator layer and the radiation transmission substrate to the light detection portion.

5. The radiation detector according to claim 4, further comprising:
- a moisture-proof protective film covering outer sides of the radiation transmission substrate and the scintillator layer,
- wherein the radiation transmission substrate and the scintillator layer are attached to the adhesive layer via the moisture-proof protective film.

6. The radiation detector according to claim 2, wherein an angle between the emission surface and the side surface of the scintillator layer is between 5° and 80°.

7. The radiation detector according to claim 6, wherein the angle between the emission surface and the side surface of the scintillator layer is between 5° and 45°.

8. The radiation detector according to claim 1, wherein the radiation transmission substrate has an opposing end portion formed on an outer side of the outer edge portion such that the outer edge portion faces the light detection portion.

9. The radiation detector according to claim 8, further comprising an adhesive layer that attaches the scintillator layer and the radiation transmission substrate to the light detection portion.

10. The radiation detector according to claim 9, further comprising:
- a moisture-proof protective film covering outer sides of the radiation transmission substrate and the scintillator layer,
- wherein the radiation transmission substrate and the scintillator layer are attached to the adhesive layer via the moisture-proof protective film.

11. The radiation detector according to claim 8, wherein an angle between the emission surface and the side surface of the seintillator layer is between 5° and 80°.

12. The radiation detector according to claim 11, wherein the angle between the emission surface and the side surface of the scintillator layer is between 5° and 45°.

13. The radiation detector according to claim 1, further comprising an adhesive layer that attaches the scintillator layer and the radiation transmission substrate to the light detection portion.

14. The radiation detector according to claim 13, further comprising:
- a moisture-proof protective film covering outer sides of the radiation transmission substrate and the scintillator layer,
- wherein the radiation transmission substrate and the scintillator layer are attached to the adhesive layer via the moisture-proof protective film.

15. The radiation detector according to claim 14, wherein an angle between the emission surface and the side surface of the scintiliator layer is between 5° and 80°.

16. The radiation detector according to claim 15, wherein the angle between the emission surface and the side surface of the scintillator layer is between 5° and 45°.

17. The radiation detector according to claim 13, wherein an angle between the emission surface and the side surface of the scintillator layer is between 5° and 80°.

18. The radiation detector according to claim 17, wherein the angle between the emission surface and the side surface of the scintillator layer is between 5° and 45°.

19. The radiation detector according to claim 1, wherein an angle between the emission surface and the side surface of the scintillator layer is between 5° and 80°.

20. The radiation detector according to claim 19, wherein the angle between the emission surface and the side surface of the scintillator layer is between 5° and 45°.

* * * * *